United States Patent Office 3,047,459
Patented July 31, 1962

3,047,459
NEW PESTICIDAL COMPOUNDS AND METHODS OF MAKING SAME
Mario Perini, Milan, and Giovanni Speroni, Florence, Italy, assignors to Montecatini-Societa Generale per l'Industria Mineraria e Chimica, Milan, Italy, a corporation of Italy
No Drawing. Filed Nov. 8, 1955, Ser. No. 545,779
Claims priority, application Italy Nov. 9, 1954
15 Claims. (Cl. 167—22)

The present invention relates to new pesticidal compounds and to the methods of making these compounds. More particularly, the invention relates to thiophosphoric esters of the general formula

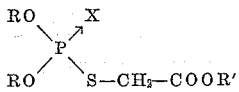

wherein X represents oxygen or sulphur, R represents lower alkyls, and R' represents a saturated straight or branched-chain alkyl.

The products according to the present invention are prepared by reacting a phosphate of the general formula

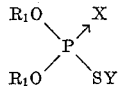

wherein Y is an alkali or alkali-earth metal or ammonium, with an ester of a halogen-substituted acetic acid of the general formula $$hal—CH_2—COOR'$$

where R' has the afore-stated meaning and hal is a halogen (Cl or Br).

A characteristic example of this synthesis is given by the following reaction in which sodium O,O-diethyldithiophosphate is reacted with ethyl chloro-acetate to yield the ethyl ester of O,O-diethyldithiophosphoryl-acetic acid:

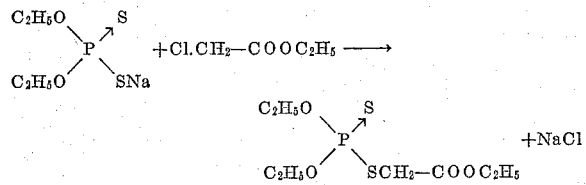

The reaction occurs with high yields in the presence of a solvent for one or both reactants.

The following can be used as solvents: monohydric aliphatic alcohols, ketones, aliphatic esters, dioxane, aromatic hydrocarbons (such as benzene, toluene and xylene). The reaction is carried out at a temperature between 10 and 150° C. A modification of the process consists in using, instead of the salt of the acid, the acid itself and a metal salt such as $Na_2CO_3$, $K_2CO_3$, $BaCO_3$, NaOH or KOH, which is sufficiently alkaline. We found that the compounds of the present invention possess decided insecticidal properties and that some are equal and even superior to prior insecticides, such as Parathion. Moreover, these insecticidal properties are coupled with a relatively low toxicity to warm-blooded animals.

Example 1

The sodium salt of 40.9 g. of diethyldithiophosphoric acid is formed by treating with 4.95 g. of Na in 100 cc. of absolute ethyl alcohol. Then, 21.7 g. of methyl chloroacetate are added and, after the mixture has been stirred for half an hour at room temperature, the alcohol is distilled off on a water bath until the reaction mass reaches a temperature of 95° C. The residue is cooled to room temperature and 150 cc. of water are added. Precipitated NaCl is thus dissolved and an oil is formed which is separated from the aqueous layer by means of a separatory funnel and washed repeatedly with water and a saturated solution of $NaHCO_3$. The oily product is then dried over $MgSO_4$ and distilled under vacuum: 42.3 g. of a straw-colored oil are obtained, having a B.P.$_{0.15}$ 122° C.

$$D_{20}^{20}=1.1880 \qquad n_D^{20}=1.4994$$

The analysis of the product is in agreement with the formula $(C_2H_5O)_2PSSCH_2—COOCH_3$.

Example 2

The sodium salt of 40.9 g. of diethyldithiophosphoric acid is formed by treating with 4.95 g. of Na in 100 cc. of absolute ethanol. Then, 24.5 g. of ethyl chloroacetate are added and, after the mixture has been stirred at room temperature for 1 hour, the alcohol is distilled off on a water bath until the reaction mass reaches a temperature of 95° C. The residue is cooled to room temperature and filtered to remove the sodium chloride. The filtrate is shaken several times with water and with a $NaHCO_3$ solution; then it is dried over $MgSO_4$ and distilled under vacuum. 43.7 g. of a straw-colored oil are obtained, having a B.P.$_{0.1}$ 110–112° C.

$$D_{20}^{20}=1.1857 \qquad n_D^{20}=1.5003$$

The analysis of the product is in agreement with the formula $(C_2H_5O)_2PSSCH_2—COOC_2H_5$.

Example 3

The sodium salt of 29 g. of dimethyldithiophosphoric acid is formed by treating with 4 g. of Na in 70 cc. of absolute methyl alcohol. Then, 18 g. of methyl chloroacetate are added and, after the mixture has been left standing at room temperature for 14 hours, the methyl alcohol is removed by distillation at normal pressure. After cooling, 100 cc. of water are added to the mass to dissolve the NaCl formed. The undissolved oil, separated in a separatory funnel, is first treated repeatedly with water and a saturated $NaHCO_3$ solution, and then dried over $MgSO_4$ and distilled under vacuum. 21 g. of a colorless oil are obtained, having a B.P.$_{0.1}$ 110° C.

$$D_{20}^{20}=1.3094 \qquad n_D^{20}=1.5207$$

The analysis of the product is in agreement with the formula $(CH_3O)_2PSSCH_2—COOCH_3$.

Example 4

A salt is formed between 35.3 g. of dimethyldithiophosphoric acid and 5 g. of Na in 100 cc. of methyl alcohol. Then 35.3 g. of ethyl chloroacetate are added and, after standing overnight and after removal of the methyl alcohol at reduced pressure, 50 cc. of water are added to the residue. The oil is extracted with $CCl_4$ and this solution shaken several times with saturated, aqueous $NaHCO_3$. The solution is then dried over $Na_2SO_4$ and distilled under vacuum. After removal of the solvent and of the tops, 21.55 g. of a colorless oil are collected, having a B.P.$_{0.2}$ 110–113° C.

$$D_{20}^{20}=1.3064 \qquad n_D^{20}=1.5200$$

The analysis of the product is in agreement with the formula $(CH_3O)_2PSSCH_2—COOC_2H_5$.

Example 5

42.8 g. of dry potassium salt of diethylthiophosphoric acid are reacted in the presence of 80 cc. of acetone (partial solution) with 20.5 g. of ethyl chloroacetate. After standing overnight at room temperature, the solvent is distilled off at reduced pressure and the residue is treated, after cooling, with 45 cc. of water in order to dissolve KCl that formed. The oil fraction is separated from the aqueous solution, shaken several times with water and with a $NaHCO_3$ solution, and is then dried over $MgSO_4$ and distilled under vacuum. 32 g. of a straw-colored oil are thus obtained, having a $B.P._{0.2}$ 120–121° C.

$$D_{20}^{20}=1.1845 \quad n_D^{20}=1.4630$$

The analysis of the product is in agreement with the formula: $(C_2H_5O)_2POSCH_2—COOC_2H_5$.

Example 6

34 g. of potassium salt of diethylthiophosphoric acid are reacted in the presence of 70 cc. of acetone (partial solution) with 22.5 g. of n-butyl chloroacetate. After standing overnight at room temperature, the solvent is distilled off and, after cooling, 40 cc. of water are added to dissolve KCl that formed. The oil fraction is separated from the aqueous solution, shaken with water and with a $NaHCO_3$ solution, dried over $MgSO_4$ and distilled under vacuum.

33.4 g. of a straw-colored oil are obtained, having a $B.P._{0.5}$ 138–140° C.

$$D_{20}^{20}=1.1144 \quad n_D^{20}=1.4616$$

The analysis of the product is in agreement with the formula $(C_2H_5O)_2POSCH_2—COOC_4H_9(n)$.

Example 7

34 g. of potassium salt of diethylthiophosphoric acid are reacted in the presence of 70 cc. of acetone with 24.6 g. of isoamyl chloroacetate. After standing overnight, the solvent is distilled off at reduced pressure by heating on a water bath and, after cooling, 40 cc. of water are added to dissolve KCl that formed. The oil fraction is separated from the aqueous solution, shaken with a $NaHCO_3$ solution and water and, after vacuum distillation, 34 g. of a straw-colored oil are obtained, having a $B.P._{0.5}$ 143–145° C.

$$D_{20}^{20}=1.1132 \quad n_D^{20}=1.4609$$

The analysis of the product corresponds with the formula $(C_2H_5O)_2POSCH_2—COOC_5H_{11}(i)$.

Example 8

29 g. of pure diethyldithiophosphoric acid dissloved in 70 cc. of acetone are neutralized with 8.5 g. of anhydrous sodium carbonate. After the carbonate is dissolved, 22 g. of isobutyl chloroacetate are added. The mixture is refluxed for 3 hours and the solvent is distilled at normal pressure on a water bath. After cooling, the residue is treated with 100 cc. of water. The sodium chloride that formed dissolves and the oil layer separated from the aqueous solution is shaken several times with water and with a bicarbonate solution until neutral in reaction. It is then dried over $MgSO_4$ and distilled under vacuum; 38 g. of a straw-colored oil are obtained, having a $B.P._{0.2}$ 120° C.

$$D_4^{20}=1.1341 \quad n_D^{20}=1.4910$$

The analysis of the product corresponds with the formula $(C_2H_5O)_2PSSCH_2—COOC_4H_9(i)$.

The products described in the examples have been used as insecticides on *Musca domestica*, on *Aphis fabae* and on *Tetranychus telarius* in parallel experiments with Parathion, a known insecticide. The results of these tests are indicated in the following table:

| Product | *Musca domestica* | | | | *Aphis fabae* | | *Tetranychus telarius* | |
|---|---|---|---|---|---|---|---|---|
| | tarsal contact | | topical application | | Spraying | | Spraying | |
| | Concentration, g./m.² | Mortality, percent | Dose, γ/fly | Mortality, percent | Active substance concentration | Mortality, percent | Active substance concentration | Mortality, percent |
| Parathion | 0.0002 | 100 | 0.08 | 100 | 0.01 | 100 | 0.01 | 100 |
| | 0.00005 | 50 | 0.01 | 45 | 0.001 | 75 | 0.001 | 80 |
| Methyl diethyldithio-phosphorylacetate | 0.005 | 100 | 0.4 | 100 | 0.1 | 98 | 0.1 | 98 |
| | 0.005 | 54 | 0.1 | 88 | 0.02 | 4 | 0.02 | 87 |
| Ehtyl diethyldithio-phosphorylacetate | 0.005 | 100 | 2 | 100 | 0.5 | 75 | 0.5 | 100 |
| | 0.001 | 27 | 0.4 | 66 | | | | |
| Isobutyl diethyldithiophosphorylacetate | 0.008 | 100 | 2 | 100 | 0.5 | 100 | 0.1 | 100 |
| | 0.002 | 20 | 0.4 | 71 | 0.1 | 40 | 0.02 | 75 |
| Methyl dimethyldithiophosphorylacetate | -------- | -------- | 2 | 100 | 0.5 | 99 | 0.5 | 93 |
| | | | 0.4 | 24 | 0.1 | 35 | 0.1 | 10 |
| Ethyl diethylthiophosphorylacetate | 0.005 | 100 | 3 | 100 | 0.5 | 100 | 0.5 | 99 |
| | | | | | 0.02 | 27 | 0.1 | 66 |
| n-Butyl diethylthiophosphorylacetate | 0.005 | 100 | 3 | 100 | 0.5 | 97 | 0.5 | 98 |
| | | | | | 0.1 | 55 | 0.1 | 60 |
| Isoamyl diethylthiophosphorylacetate | 0.005 | 100 | 3 | 100 | 0.5 | 100 | 0.1 | 100 |
| | | | | | 0.1 | 55 | 0.02 | 85 |
| Ethyl dimethyldithiophosphorylacetate | 0.24 | 100 | 50 | 100 | 0.5 | 30 | 0.5 | 65 |
| | 0.025 | 98 | 10 | 84 | | | | |

The herein-disclosed products are only moderately toxic to warm-blooded animals, as indicated by the experimental data collected in the following table, and based on the toxicity of Parathion as a standard. Of the described products, the derivatives of dithiophosphorylacetic acid show the lowest toxicity.

Acute toxicity upon intravenous and oral administrations, expressed in mmg./kg. as $DL_{50}$ on mice, 24 hours after administration.

| Product | Intravenous | Based on Parathion | Oral | Based on Parathion |
|---|---|---|---|---|
| Parathion | 5.7 | 1 | 8.2 | 1 |
| Methyl diethyldithiophosphorylacetate | 222.5 | 1/38 | 1,780 | 1/220 |
| Ethyl diethyldithiophosphorylacetate | 106 | 1/19 | 1,500 | 1/180 |
| Isobutyl diethyldithiophosphorylacetate | 398 | 1/70 | 1,910 | 1/230 |
| Methyl dimethyldithiophosphorylacetate | 231 | 1/40 | 570 | 1/70 |
| Ethyl diethylthiophosphorylacetate | 31.1 | 1/5.4 | 384.6 | 1/47 |
| n-Butyl diethylthiophosphorylacetate | 47.7 | 1/8.3 | 1,343 | 1/165 |
| Isoamyl diethylthiophosphorylacetate | 72.10 | 1/12 | 1,150 | 1/140 |

The herein disclosed compounds may be used as such as insecticides or fungicides, or one or several of them may be admixed with other known pesticides, such as insecticides and/or fungicides and applied as solids or in form of solutions or dispersions in inert vehicles. More-

We claim:
1. As new pesticides, thiophosphoric acid esters of the general formula

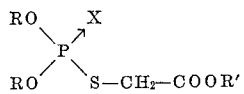

wherein X is taken from the group consisting of oxygen and sulphur, R represents lower alkyls and R' represents a member of the group consisting of lower straight and branched-chain alkyls.

2. As a new pesticide, the methyl ester of O,O-diethyl-dithiophosphoryl-acetic acid.
3. As a new pesticide, the isobutyl ester of O,O-diethyl-dithiophosphoryl-acetic acid.
4. As a new pesticide, the methyl ester of O,O-dimethyl-dithiophosphoryl-acetic acid.
5. As a new pesticide, the ethyl ester of O,O-dimethyl-dithiophosphoryl-acetic acid.
6. As a new pesticide, the ethyl ester of O,O-diethyl-thiophopsphoryl-acetic acid.
7. As a new pesticide, the n-butyl ester of O,O-diethyl-thiophosphoryl-acetic acid.
8. As a new pesticide, the isoamyl ester of O,O-diethyl-thiophosphoryl-acetic acid.
9. In the art of controlling a pest, the improvement comprising applying to the locale of the pest, a thiophosphoric acid ester of the general formula

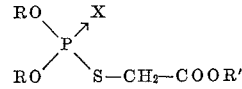

wherein X is taken from the group consisting of oxygen and sulphur, R represents lower alkyls and R' represents a member of the group consisting of lower straight and branched-chain alkyls.

10. The invention defined in claim 9, the pest being taken from the group consisting of *Musca domestica*, *Aphis fabae*, and *Tetranychus telarius*.

11. The invention defined in claim 9 in which X is sulphur.

12. In the art of controlling a pest comprising a member of the group consisting of *Musca domestica*, *Aphis fabae*, and *Tetranychus telarius*, the improvement comprising applying to the locale of the pest the ethyl ester of O,O-diethyldithiophosphoryl-acetic acid.

13. A thiophosphoric acid ester of the formula

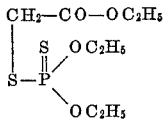

14. A thiophosphoric acid ester of the formula:

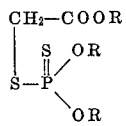

in which the R groups represent lower alkyl radicals.

15. A thiophosphoric acid ester of the formula:

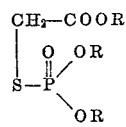

in which the R groups represent lower alkyl radicals.

References Cited in the file of this patent
UNITED STATES PATENTS

| | | |
|---|---|---|
| 2,266,514 | Romieux et al. | Dec. 16, 1941 |
| 2,494,284 | Cassaday et al. | Jan. 10, 1950 |
| 2,645,657 | Rudel et al. | July 14, 1953 |
| 2,802,856 | Norman et al. | Aug. 13, 1957 |

OTHER REFERENCES

Kosolapoff: Chemical Abstracts, vol. 48, pp. 6639–6640, 9902–9903 (1954).